United States Patent
Hashimoto

(10) Patent No.: US 10,532,928 B2
(45) Date of Patent: Jan. 14, 2020

(54) METHOD FOR PRODUCING SULFIDE SOLID ELECTROLYTE MATERIAL THAT ALLOWS A CONCENTRATION OF LITHIUM HALIDE TO INCREASE AND THAT ALLOWS DRYING AT A LOW TEMPERATURE

(71) Applicant: TOYOTA JIDOSHA KABUSHIKI KAISHA, Toyota-shi, Aichi-ken (JP)

(72) Inventor: Yuichi Hashimoto, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/990,876

(22) Filed: May 29, 2018

(65) Prior Publication Data

US 2018/0346332 A1    Dec. 6, 2018

(30) Foreign Application Priority Data

Jun. 6, 2017  (JP) .................................. 2017-111589

(51) Int. Cl.
| | |
|---|---|
| H01M 10/0562 | (2010.01) |
| C01B 17/38 | (2006.01) |
| C01D 15/00 | (2006.01) |
| H01M 10/052 | (2010.01) |

(52) U.S. Cl.
CPC .............. C01B 17/38 (2013.01); C01D 15/00 (2013.01); H01M 10/052 (2013.01); H01M 10/0562 (2013.01); *C01P 2006/40* (2013.01); *H01M 2300/0068* (2013.01)

(58) Field of Classification Search
CPC .............. C01B 17/38; H01M 10/0562; H01M 2300/0068; C01D 15/00; C01P 2006/40

USPC ......................................................... 429/322
See application file for complete search history.

(56) References Cited

U.S. PATENT DOCUMENTS

| | | | | |
|---|---|---|---|---|
| 6,022,640 | A * | 2/2000 | Takada .................. | H01M 4/131 |
| | | | | 429/231.1 |
| 2014/0272554 | A1* | 9/2014 | Yanagi .............. | H01M 10/0562 |
| | | | | 429/189 |
| 2016/0149259 | A1* | 5/2016 | Osada ............... | H01M 10/0562 |
| | | | | 429/323 |

FOREIGN PATENT DOCUMENTS

| | | |
|---|---|---|
| JP | 2014-179265 A | 9/2014 |
| JP | 2014-186820 A | 10/2014 |

* cited by examiner

*Primary Examiner* — Gary D Harris
(74) *Attorney, Agent, or Firm* — Sughrue Mion, PLLC

(57) ABSTRACT

A main object of the present disclosure is to provide a method for producing a sulfide solid electrolyte material, the method that allows a concentration of lithium halide to increase and that allows drying at a low temperature. The present disclosure achieves the object by providing a method for producing a sulfide solid electrolyte material, the method comprising: a drying step of drying a precursor aqueous solution containing LiI, LiBr, and LiOH to remove water and obtain a precursor mixture; and an electrolyte synthesizing step including a sulfidization treatment to sulfurize the LiOH in the precursor mixture and obtain LiHS, a de-sulfide-hydrogenating treatment to desorb a hydrogen sulfide from the LiHS and obtain $Li_2S$, and a synthesizing treatment to make the $Li_2S$ to react with an auxiliary material; wherein a molar ratio of the LiOH with respect to the LiI and the LiBr, LiOH/(LiI+LiBr), in the precursor aqueous solution is 3 or more and less than 6.

3 Claims, 4 Drawing Sheets

METHOD FOR PRODUCING SULFIDE SOLID ELECTROLYTE MATERIAL THAT ALLOWS A CONCENTRATION OF LITHIUM HALIDE TO INCREASE AND THAT ALLOWS DRYING AT A LOW TEMPERATURE

TECHNICAL FIELD

The present disclosure relates to a method for producing a sulfide solid electrolyte material.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium ion battery has been presently noticed from the viewpoint of a high energy density among various kinds of batteries.

A sulfide solid electrolyte material has been known as an electrolyte material used in a lithium ion battery. For example, Patent Literature 1 discloses a method for producing a sulfide solid electrolyte material, the method comprising drying a precursor aqueous solution containing LiI and LiOH, and after that, conducting a sulfidization treatment, a de-sulfide-hydrogenating treatment, and a synthesizing treatment. Also, Patent Literature 2 discloses a method for producing a sulfide solid electrolyte material, the method comprising preparing a raw material mixture containing LiHS and LiX (X is F, Cl, Br, or I) from a single Li source, and after that, conducting a de-sulfide-hydrogenating treatment and a synthesizing treatment.

CITATION LIST

Patent Literatures

Patent Literature 1: Japanese Patent Application Laid-Open (JP-A) No. 2014-186820
Patent Literature 2: JP-A No. 2014-179265

SUMMARY OF DISCLOSURE

Technical Problem

The deliquescency of LiI is high and thus a high temperature (such as 250° C. or more) is required for drying. Meanwhile, Patent Literature 1 describes in Examples that addition of 6 times of LiOH to LiI in the molar basis allows drying at a low temperature (such as 200° C. or less). However, addition of a large amount of LiOH to LiI decreases the concentration of LiI.

The present disclosure has been made in view of the actual circumstances, and the main object thereof is to provide a method for producing a sulfide solid electrolyte material, the method that allows a concentration of lithium halide to increase and that allows drying at a low temperature.

Solution to Problem

In order to solve the problem, the present disclosure provides a method for producing a sulfide solid electrolyte material, the method comprising: a drying step of drying a precursor aqueous solution containing LiI, LiBr, and LiOH to remove water and obtain a precursor mixture; and an electrolyte synthesizing step including a sulfidization treatment to sulfurize the LiOH in the precursor mixture and obtain LiHS, a de-sulfide-hydrogenating treatment to desorb a hydrogen sulfide from the LiHS and obtain $Li_2S$, and a synthesizing treatment to make the $Li_2S$ to react with an auxiliary material; wherein a molar ratio of the LiOH with respect to the LiI and the LiBr, LiOH/(LiI+LiBr), in the precursor aqueous solution is 3 or more and less than 6.

According to the present disclosure, drying in the state LiI, LiBr, and LiOH coexist allows the concentration of lithium halide to increase, and allows the drying at a low temperature.

In the disclosure, the molar ratio of the LiBr with respect to the LiI, LiBr/LiI, in the precursor aqueous solution may be 1 or more and 1.5 or less.

In the disclosure, a drying temperature in the drying step may be 200° C. or less.

Advantageous Effects of Disclosure

The method for producing a sulfide solid electrolyte material of the present disclosure exhibits effects such that increasing the concentration of lithium halide and drying at a low temperature are possible.

DESCRIPTION OF EMBODIMENTS

The method for producing a sulfide solid electrolyte material of the present disclosure is hereinafter described in details.

Figure 1:
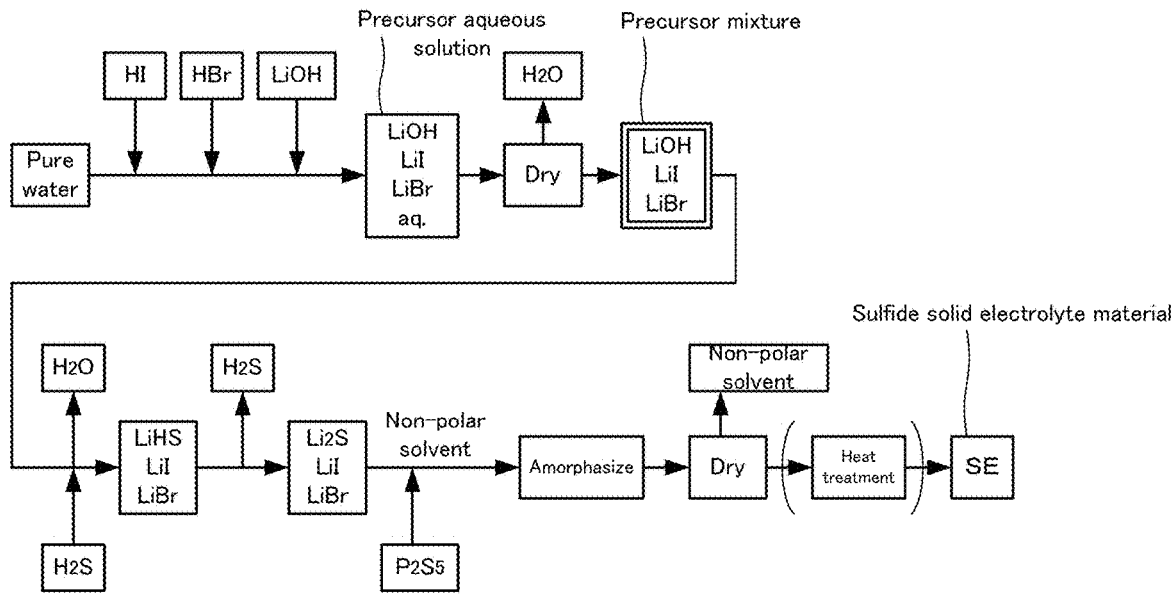
FIG. 1 is a flow chart showing an example of the method for producing a sulfide solid electrolyte material of the present disclosure.

FIG. 1 is a flow chart showing an example of the method for producing a sulfide solid electrolyte material of the present disclosure. In FIG. 1, first, HI, HBr, and LiOH are mixed in pure water and neutralized to obtain a precursor aqueous solution containing LiI, LiBr, and LiOH. Next, the precursor aqueous solution is dried to remove water and obtain a precursor mixture. Next, the LiOH in the precursor mixture is sulfurized to obtain LiHS. Next, a hydrogen sulfide is desorbed from the LiHS to obtain $Li_2S$. Next, the obtained mixture is dispersed in a nonpolar solvent and a specific auxiliary material (such as $P_2S_5$) is added thereto to amorphize. After that, the nonpolar solvent is removed by drying, and thereby a sulfide solid electrolyte material, a sulfide glass, is obtained. Also, if a heat treatment is conducted after producing the sulfide glass, a sulfide solid electrolyte material, glass ceramic, is obtained.

According to the present disclosure, drying in the state LiI, LiBr, and LiOH coexist allows the concentration of lithium halide to increase, and allows the drying at a low temperature. As described above, Patent Literature 1 describes in Examples that addition of 6 times of LiOH to LiI in the molar basis allows drying at a low temperature (such as 200° C. or less). However, addition of a large amount of LiOH to LiI decreases the concentration of LiI.

Meanwhile, LiBr is a material having high deliquescency similarly to LiI. Accordingly, it is presumed that addition of 6 times of LiOH to LiBr in the molar basis is also necessary. Thus, when LiI and LiBr coexist, it is presumed that 12 times of LiOH in the molar basis is necessary (LiOH/(LiI+LiBr)=6). However, when LiI and LiBr coexist, surprisingly, it has been found out that drying at a low temperature with smaller amount of LiOH was possible.

The LiOH is a material that becomes $Li_2S$ after the sulfidization treatment and the de-sulfide-hydrogenating treatment. Thus, if drying at a low temperature is allowed with a small amount of the LiOH, the concentration of lithium halide (LiI and LiBr), that is, the proportion of the lithium halide with respect to the $Li_2S$, may be increased. Incidentally, if the concentration of the lithium halide is increased, for example, a sulfide solid electrolyte material with high Li ion conductivity may be obtained. Also, equimolar LiI and LiBr were present in the later described Experiment Examples such as Experiment Examples 2 and 3; however, in Experiment Examples 2 and 3, even though just less than 6 times of LiOH to LiI in the molar basis was present, drying at a low temperature was possible and it can be said that the concentration of the LiI was increased.

In all probability, it is presumed that coexistence of the LiI and the LiBr caused a multiplier action to facilitate elimination of the water molecules held around the LiBr and around the LiI. The multiplier action is presumed to be caused as the result of the LiI and the LiBr sharing one LiOH.

Also, in the present disclosure, a precursor aqueous solution containing LiI, LiBr, and LiOH is dried to remove water and obtain a precursor mixture. Thus, the dispersibility of the LiI, the LiBr, and the LiOH included in the precursor mixture is extremely high. Accordingly, there is an advantage that a sulfide solid electrolyte material may be obtained in a short time by conducting a sulfidization treatment, a de-sulfide-hydrogenating treatment, and a synthesizing treatment to such a precursor mixture.

Figure 2:
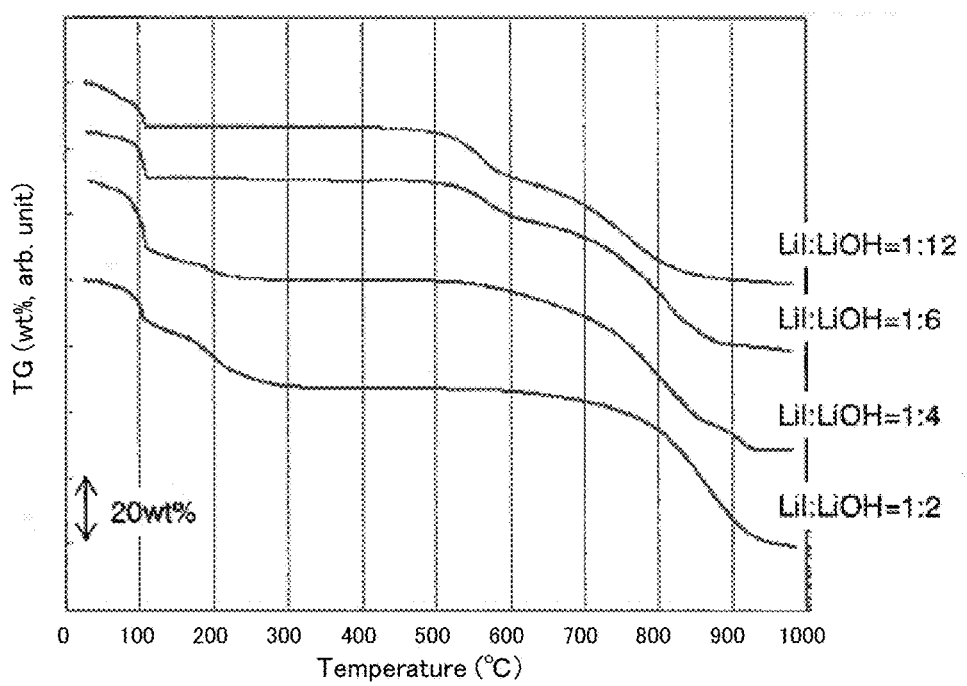
FIG. 2 is the result of the TG/DTA measurement (TG curve) for the dry samples obtained in Reference Examples 1 to 4.

Incidentally, Patent Literature 1 discloses a constitutional diagram of a LiI—LiOH system as FIG. 2, and in the explanation thereof, it is described that a stable phase is formed when LiI:LiOH=1:1, or when LiI:LiOH=1:4. However, in the later described Reference Example 2, weight loss due to water evaporation was confirmed in the vicinity of 250° C. when LiI:LiOH=1:4, which suggested that the amount of LiOH was insufficient for drying at a low temperature. Accordingly, it can be said that 6 times or more of the LiOH to LiI in the molar basis is necessary for drying at a low temperature.

The method for producing a sulfide solid electrolyte material of the present disclosure is hereinafter described in each step.

1. Drying Step

The drying step in the present disclosure is a step of drying a precursor aqueous solution containing LiI, LiBr, and LiOH to remove water and obtain a precursor mixture.

The precursor aqueous solution contains LiI, LiBr, and LiOH. Incidentally, "aqueous solution" in the present disclosure refers to a solution containing at least water as a solvent; water may be the only solvent, and an additional solvent other than water may be further included. In particular, the proportion of water among all the solvents in the aqueous solution is preferably 50 weight % or more.

Also, there are no particular limitations on the method for obtaining the precursor aqueous solution containing LiI, LiBr, and LiOH. Examples thereof may include a method in which an I source, a Br source, and an OH source are mixed. Examples of the I source may include LiI, HI, and $I_2$. The reaction of HI with LiOH allows LiI to be obtained (HI+LiOH→LiI+$H_2O$). Examples of the Br source may include LiBr, HBr, and $Br_2$. The reaction of HBr with LiOH allows LiBr to be obtained (HBr+LiOH→LiBr+$H_2O$). Examples of the OH source may include LiOH and $Ca(OH)_2$.

A molar ratio of the LiOH with respect to the LiI and the LiBr, LiOH/(LiI+LiBr), in the precursor aqueous solution is usually 3 or more. Meanwhile, the molar ratio is usually less than 6, may be 5.5 or less, may be 5 or less, may be 4 or less, and may be less than 4.

The molar ratio of the LiBr with respect to the LiI, LiBr/LiI, in the precursor aqueous solution is, for example, 0.5 or more, and may be 1 or more. Meanwhile, the molar ratio is, for example, 2 or less, and may be 1.5 or less.

Also, there are no particular limitations on the total concentration of the LiI, the LiBr, and the LiOH in the precursor aqueous solution. For example, the total concentration is 0.5 weight % or more, and may be 1 weight % or more. Meanwhile, the total concentration is, for example, 10 weight % or less.

There are no particular limitations on the method for drying the precursor aqueous solution, and examples thereof may include drying by heating, drying under reduced pressure (such as vacuum drying), freeze drying, spray drying, and arbitrary combination of these. Also, a cold trap cooled by a refrigerant such as a liquid nitrogen may be used to efficiently remove the evaporated or sublimated solvent (such as water). Incidentally, in the drying step, heating may be conducted and may not be conducted.

A drying temperature in the drying step is, for example, 200° C. or less, may be 150° C. or less, and may be 120° C. or less. Meanwhile, the drying temperature is, for example, 50° C. or more, and may be 70° C. or more. Incidentally, in general, the solvent is more easily evaporated at a low drying temperature under the environment in reduced pressure than under the environment in atmospheric pressure. Thus, the drying temperature under the environment in reduced pressure may be less than 100° C.

The precursor aqueous solution is dried to remove water and obtain the precursor mixture. The amount of water in the precursor mixture is, for example, 5 weight % or less, may be 3 weight % or less, and may be 1 weight % or less. The amount of water may be measured by TG/DTA.

2. Electrolyte Synthesizing Step

The electrolyte synthesizing step in the present disclosure is a step including a sulfidization treatment to sulfurize the LiOH in the precursor mixture and obtain LiHS, a de-sulfide-hydrogenating treatment to desorb a hydrogen sulfide from the LiHS and obtain $Li_2S$, and a synthesizing treatment to make the $Li_2S$ to react with an auxiliary material.

There are no particular limitations on the electrolyte synthesizing step if it includes a sulfidization treatment, de-sulfide-hydrogenating treatment, and a synthesizing treatment. The de-sulfide-hydrogenating treatment is usually conducted after the sulfidization treatment. Meanwhile, the order and the timing of the de-sulfide-hydrogenating treatment and the synthesizing treatment may be arbitrary arranged. For example, the synthesizing treatment may be conducted after the de-sulfide-hydrogenating treatment, and the de-sulfide-hydrogenating treatment may be conducted after the synthesizing treatment. In other words, necessary procedures in the electrolyte synthesizing step are at least sulfurizing the LiOH to obtain LiHS, desorbing a hydrogen sulfide from the LiHS and obtaining $Li_2S$, and synthesizing a sulfide solid electrolyte material. Above all, a sulfide solid electrolyte material is preferably synthesized by adding a specific auxiliary material after desorbing the hydrogen sulfide.

(1) Sulfidization Treatment

The sulfidization treatment is a treatment to sulfurize the LiOH in the precursor mixture and obtain LiHS (lithium hydrosulfide, also referred to as LiSH).

There are no particular limitations on the method for sulfurizing the LiOH, and examples thereof may include a method that makes the precursor mixture to react with sulfide gas. Examples of the sulfide gas may include $H_2S$, $CS_2$, and an elemental sulfur vapor. Incidentally, the sulfide gas may be diluted with inert gas such as argon gas. The temperature to bring the sulfide gas into the reaction is, for example, in a range of 0° C. to 200° C. Also, the time for bringing the sulfide gas into the reaction is, for example, in a range of 10 minutes to 180 minutes.

Also, it is preferable that the sulfidization of the LiOH is conducted in the state the precursor mixture is solved or dispersed in a solvent, or in an inert gas atmosphere. Incidentally, the solvent in the present disclosure means not only a solvent in a strict sense that a solute is dissolved, but also includes the meaning of a dispersion medium. The sulfidization of the LiOH may be conducted in a polar solvent.

There are no particular limitations on the polar solvent, but it is preferably a solvent that dissolves at least a portion of the LiOH. Incidentally, the solubility of the solute usually increases as the solvent is heated; thus, it is preferable that the sulfidization of the LiOH is conducted as to the extent the solute is dissolved. Also, specific examples of the polar solvent may include a protonic polar solvent. An example of the protonic polar solvent is an alcohol having 1 to 8 carbon atoms. Specific examples of the alcohol my include methanol, ethanol, propanol, butanol, t-butyl alcohol, 2-pentanol, 2-methyl-1-butanol, and 2,2-dimethyl-1-propanol. Additional examples of the protonic polar solvent may include phenols such as phenol and cresol.

Meanwhile, examples of the inert gas atmosphere may include an argon gas atmosphere and a nitrogen gas atmosphere.

(2) De-Sulfide-Hydrogenating Treatment

The de-sulfide-hydrogenating treatment is a treatment to desorb a hydrogen sulfide from the LiHS and obtain $Li_2S$. In specific, the reaction of $2LiHS \rightarrow Li_2S+H_2S$ occurs.

There are no particular limitations on the de-sulfide-hydrogenating treatment, and examples thereof may include a drying by heating treatment. The temperature for the drying by heating treatment is, for example, in a range of 150° C. to 220° C. The time for the drying by heating treatment is, for example, in a range of 15 minutes to 6 hours. Also, the drying by heating treatment is preferably conducted in the state the sulfurized precursor mixture is dissolved or dispersed in a solvent, or in an inert gas atmosphere. In the former case, in particular, a non-protonic solvent is preferably used as a solvent, and a non-polar non-protonic solvent is more preferable. The reason therefor is to inhibit the deterioration of the $Li_2S$. Above all, the solvent used for the de-sulfide-hydrogenating treatment is preferably alkane which is liquid at a normal temperature (25° C.). On the other hand, examples of the inert gas atmosphere may include an argon gas atmosphere and a nitrogen gas atmosphere.

Also, the sulfidization treatment and the de-sulfide-hydrogenating treatment may be conducted as one reaction. In specific, sulfidization and de-sulfide-hydrogenation may be continuously conducted by arranging a relatively high temperature for sulfurizing the LiOH in the precursor mixture containing LiI, LiBr and LiOH. Also, the sulfidization treatment and the de-sulfide-hydrogenating treatment may be continuously conducted in the state the precursor mixture is dissolved or dispersed in a solvent.

(3) Synthesizing Treatment

The synthesizing treatment in the present disclosure is a treatment to make the $Li_2S$ to react with an auxiliary material. The auxiliary material is preferably made to react with the precursor mixture before the sulfidization treatment, the precursor mixture after the sulfidization treatment, the precursor mixture before the de-sulfide-hydrogenating treatment, or the precursor mixture after the de-sulfide-hydrogenating treatment.

There are no particular imitations on the synthesizing treatment if the treatment allows the desired sulfide solid electrolyte material to be obtained; however, it is preferable that an auxiliary material containing an A element (A is P, Si, Ge, Al, or B) and a S element is brought into the reaction. The auxiliary material may, as the A element, contain an A-containing compound and may contain a simple substance of A. Examples of the A-containing compound may include a sulfide of A, and specific examples thereof may include $P_2S_3$, $P_2S_5$, $SiS_2$, $GeS_2$, $Al_2S_3$, and $B_2S_3$. Also, the auxiliary material may contain two kinds or more of the A element. Also, the auxiliary material may, as the S element, contain a S-containing compound or may contain a simple substance of S. Examples of the S-containing compound may include the above described sulfides.

There are no particular limitations on the composition of the sulfide solid electrolyte material. For example, the proportion of the $Li_2S$ with respect to the total of the $Li_2S$ and $P_2S_5$ is, in a range of 70 mol % to 80 mol %, may be in a range of 72 mol % to 78 mol %, and may be in a range of 74 mol % to 76 mol %. The reason therefor is to obtain a sulfide solid electrolyte material with high chemical stability. In particular, when the proportion of the $Li_2S$ is 75 mol % (when $Li_2S:P_2S_5=75:25$), it is possible to obtain a sulfide solid electrolyte material provided with an ion conductor having an ortho composition ($Li_3PS_4$), LiI, and LiBr.

The proportion of the LiI and the LiBr in the sulfide solid electrolyte material is, respectively, for example, in a range of 1 mol % to 60 mol %, may be in a range of 5 mol % to 50 mol %, may be in a range of 10 mol % to 40 mol %, and may be in a range of 10 mol % to 30 mol %.

There are no particular limitations on the synthesizing treatment if the treatment allows the desired sulfide solid electrolyte material to be obtained. An example of the synthesizing treatment may be an amorphizing treatment. A sulfide solid electrolyte material that is sulfide glass may usually be obtained by conducting an amorphizing treatment. Examples of the amorphizing treatment may include mechanical milling. Mechanical milling is a method that a raw material is mixed while a mechanical energy is applied to the material. Examples of mechanical milling may include a ball mill, a vibrator mill, a turbo mill, mechano-fusion, and a disc mill. The number of the soleplate revolution for planetary ball milling is, for example, in a range of 200 rpm to 500 rpm. Also, the treatment time for the planetary ball milling is, for example, in a range of 1 hour to 100 hours. Mechanical milling may be dry mechanical milling and may be wet mechanical milling, but the latter is preferable. The reason therefor is to obtain a sulfide glass with higher amorphous nature.

Additional examples of the synthesizing treatment may include an amorphizing treatment and a heating treatment. A sulfide solid electrolyte material that is glass ceramic may be obtained by conducting a heating treatment after an amorphizing treatment. The temperature for the heating treatment is preferably the temperature of crystallization or more; for example, it is in a range of 160° C. to 200° C. The time for the heating treatment is, for example, in a range of 1 minute to 24 hours. Also, the heating treatment is preferably conducted in an inert gas atmosphere (such as an Ar gas atmosphere). The reason therefor is to prevent the deterioration (such as oxidization) of the glass ceramic. Examples of the heating treatment may include a method using a burning furnace.

Further additional examples of the synthesizing treatment may include a solid phase reaction treatment. A sulfide solid electrolyte material that is a crystalline material may be obtained by conducting a solid phase reaction treatment.

3. Sulfide Solid Electrolyte Material

The sulfide solid electrolyte material obtained by the present disclosure comprises at least LiI and LiBr, and usually further comprises an ion conductor (such as $Li_3PS_4$). Also, it is preferable that at least a portion of the LiI and the LiBr is usually present in the state taken into the structure of the ion conductor as a LiI component and a LiBr component.

For example, the ion conductor preferably comprises Li, A (A is at least one kind of P, Si, Ge, Al, and B), and S. Above all, the ion conductor preferably comprises an ortho composition or the composition close thereto. The reason therefor is to obtain a sulfide solid electrolyte material with high chemical stability. In specific, it is preferable that the ion conductor mainly contains an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure). The proportion of the anion structure of an ortho composition with respect to all the anion structures in the ion conductor is, for example, 50 mol % or more, may be 70 mol % or more, and may be 90 mol % or more.

The sulfide solid electrolyte material may be sulfide glass, may be glass ceramic (crystallized sulfide glass), and may be a crystalline material. Also, examples of the shape of the sulfide solid electrolyte material may include a granular shape. The average particle size ($D_{50}$) of the sulfide solid electrolyte material is, for example, in a range of 0.1 μm to 50 μm. Also, the Li ion conductivity of the sulfide solid electrolyte material at a normal temperature is, for example, $1 \times 10^{-3}$ S/cm or more. Also, the sulfide solid electrolyte material may be applied for an arbitrary use that utilizes the Li ion conductivity; above all, preferably used for a lithium ion battery.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Reference Example 1

Hydriodic acid (from Wako Pure Chemical Industries, Ltd., Guaranteed Reagent, HI content: 56.6 weight %) of 8.834 g was mixed with lithium hydroxide monohydrate ($LiOH.H_2O$, from Kojundo Chemical Lab. Co., Ltd.) of 4.920 g to obtain a mixture solution. Incidentally, the $LiOH.H_2O$ was dissolved in advance using extra pure water. The mixture solution was filtrated and then water thereof was removed by an evaporator (at the temperature of 60° C., diaphragm pump). Further, the product was dried using an oil pump (60° C.) and a liquid nitrogen trap to obtain a dry sample. The ratio of the HI and the LiOH was HI:LiOH=1:3 in the molar basis, which corresponds to LiI:LiOH=1:2.

Reference Example 2

A dry sample was obtained in the same manner as in Reference Example 1, except that the amount of the $LiOH.H_2O$ was changed to 8.200 g. The ratio of the HI and the LiOH was HI:LiOH=1:5 in the molar basis, which corresponds to LiI:LiOH=1:4.

Reference Example 3

A dry sample was obtained in the same manner as in Reference Example 1, except that the amount of the $LiOH.H_2O$ was changed to 11.48 g. The ratio of the HI and the LiOH was HI:LiOH=1:7 in the molar basis, which corresponds to LiI:LiOH=1:6.

Reference Example 4

A dry sample was obtained in the same manner as in Reference Example 1, except that the amount of the $LiOH.H_2O$ was changed to 21.32 g. The ratio of the HI and the LiOH was HI:LiOH=1:13 in the molar basis, which corresponds to LiI:LiOH=1:12.

[Evaluation]
Observation of Appearance

The appearance of the dry samples obtained in Reference Examples 1 to 4 was visually observed. The results are shown in Table 1.

TABLE 1

|  | HI/LiOH (molar ratio) | LiI/LiOH (molar ratio) | LiOH/ LiI | State after drying |
|---|---|---|---|---|
| Reference Example 1 | 1/3 | 1/2 | 2 | Sherbet-like |
| Reference Example 2 | 1/5 | 1/4 | 4 | Sherbet-like |
| Reference Example 3 | 1/7 | 1/6 | 6 | White bulk-like |
| Reference Example 4 | 1/13 | 1/12 | 12 | White bulk-like |

As shown in Table 1, the dry samples obtained in Reference Examples 1 and 2 were sherbet-like, and the remained amount of water was much. On the other hand, the dry samples obtained in Reference Examples 3 and 4 were white bulk-like powder. In this manner, LiOH/LiI=6 or more was necessary to obtain a powder dry sample.

Water Amount Measurement

A water amount measurement was conducted for the dry samples obtained in Reference Examples 1 to 4. A Differential thermogravimetric simultaneous analyzer (TG/DTA apparatus from Hitachi High-Tech Science Corporation) was used for the water amount measurement. Incidentally, an alumina was used as the primary standard. The results of the water amount measurement (TG curves) are shown in FIG. 2.

As shown in FIG. 2, the weight loss due to water evaporation was confirmed in the vicinity of 300° C. in Reference Example 1 (LiI:LiOH=1:2). Also, the weight loss due to water evaporation was confirmed in the vicinity of 250° C. in Reference Example 2 (LiI:LiOH=1:4). On the other hand, it was confirmed that the weight loss due to water evaporation ended in the vicinity of 110° C. in Reference Example 3 (LiI:LiOH=1:6) and Reference Example 4 (LiI:LiOH=1:12). In other words, it was confirmed that the difference in the amount of water from the dry region (such as in the region of 300° C. to 400° C. of Reference Examples 3 and 4) was 1% or less, even when the temperature for heating was approximately 110° C. Incidentally, in FIG. 2, the weight loss at approximately 500° C. or more is the loss due to the dehydration of the LiOH ($2LiOH \rightarrow Li_2O+H_2O$).

Figure 3:
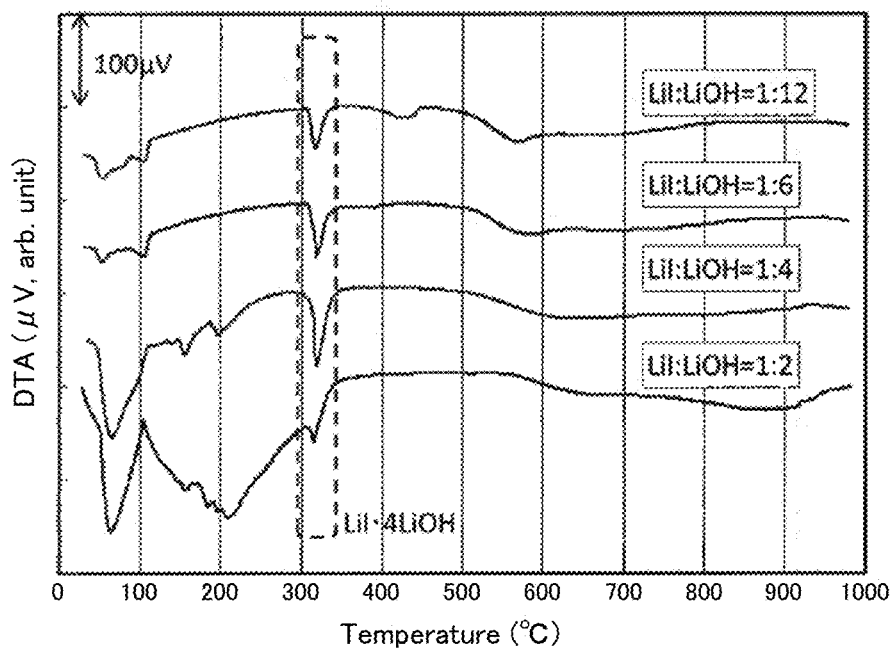
FIG. 3 is the result of the TG/DTA measurement (DTA curve) for the dry samples obtained in Reference Examples 1 to 4.

Also, the DTA curves are shown in FIG. 3. As shown in FIG. 3, the endothermic peak presumed to be the melting reaction of LiI.4LiOH was confirmed in the vicinity of 320° C. in Reference Example 2 (LiI:LiOH=1:4), in Reference Example 3 (LiI:LiOH=1:6), and in Reference Example 4 (LiI:LiOH=1:12). Meanwhile, the endothermic peak was slightly confirmed in Reference Example 1 (LiI:LiOH=1:2). Accordingly, it was presumed that the LiOH eliminated the water molecules held around the LiI, and as the result, sufficient drying at a lower temperature was possible. Incidentally, the endothermic peak was confirmed also in Reference Example 2 (LiI:LiOH=1:4); however, as shown in the above described FIG. 2, the weight loss due to water evaporation was confirmed in the vicinity of 250° C., and it was confirmed that the amount of the LiOH was insufficient for drying at a low temperature.

Experiment Example 1

Hydriodic acid (from Wako Pure Chemical Industries, Ltd., Guaranteed Reagent, HI content: 56.6 weight %) of 8.834 g, hydrobromide (from NACALAI TESQUE, INC., Guaranteed Reagent, HBr content: 48.1 weight %) of 6.575 g, and lithium hydroxide monohydrate ($LiOH.H_2O$, from Kojundo Chemical Lab. Co., Ltd.) of 6.560 g were mixed to obtain a mixture solution. Incidentally, the $LiOH.H_2O$ was dissolved in advance using extra pure water. The mixture solution was filtrated and then water thereof was removed by an evaporator (at the temperature of 60° C., diaphragm pump). Further, the product was dried using an oil pump (60° C.) and a liquid nitrogen trap to obtain a dry sample. The ratio of the HI, the HBr, and the LiOH was HI:HBr:LiOH=1:1:4 in the molar basis, which corresponds to LiI:LiBr:LiOH=1:1:2.

Experiment Example 2

A dry sample was obtained in the same manner as in Experiment Example 1, except that the amount of the $LiOH.H_2O$ was changed to 13.12 g. The ratio of the HI, the HBr, and the LiOH was HI:HBr:LiOH=1:1:8 in the molar basis, which corresponds to LiI:LiBr:LiOH=1:1:6.

Experiment Example 3

A dry sample was obtained in the same manner as in Experiment Example 1, except that the amount of the $LiOH.H_2O$ was changed to 16.34 g. The ratio of the HI, the HBr, and the LiOH was HI:HBr:LiOH=1:1:10 in the molar basis, which corresponds to LiI:LiBr:LiOH=1:1:8.

Experiment Example 4

A dry sample was obtained in the same manner as in Experiment Example 1, except that the amount of the $LiOH.H_2O$ was changed to 22.96 g. The ratio of the HI, the HBr, and the LiOH was HI:HBr:LiOH=1:1:14 in the molar basis, which corresponds to LiI:LiBr:LiOH=1:1:12.

[Evaluation]

Observation of Appearance

The appearance of the dry samples obtained in Experiment Examples 1 to 4 was visually observed. The results are shown in Table 2.

TABLE 2

| | HI/HBr/LiOH (molar ratio) | LiI/LiBr/LiOH (molar ratio) | LiOH/ (LiI + LiBr) | State after drying |
|---|---|---|---|---|
| Experiment Example 1 | 1/1/4 | 1/1/2 | 1 | Sherbet-like |
| Experiment Example 2 | 1/1/8 | 1/1/6 | 3 | White bulk-like |
| Experiment Example 3 | 1/1/10 | 1/1/8 | 4 | White bulk-like |
| Experiment Example 4 | 1/1/14 | 1/1/12 | 6 | White bulk-like |

As shown in Table 2, the dry sample obtained in Experiment Example 1 was sherbet-like, and the remained amount of water was much. On the other hand, the dry samples obtained in Experiment Examples 2 to 4 were white bulk-like powder. In this manner, LiOH/(LiI+HBr)=3 or more was necessary to obtain a powder dry sample.

Here, in the above described Reference Examples 1 to 4, LiOH/LiI=6 or more was necessary to obtain a powder dry sample. Accordingly, it was presumed that, if LiBr were added thereto, LiOH/(LiI+LiBr)=6 or more was also necessary. However, in Experiment Examples 2 and 3, it was possible to obtain powder dry samples even when LiOH/(LiI+LiBr) was less than 6. The reason therefor was presumed that coexistence of the LiBr and the LiI caused a multiplier action to facilitate elimination of the water molecules held around the LiBr and around the LiI.

Water Amount Measurement

A water amount measurement was conducted for the dry samples obtained in Experiment Examples 1 to 4. A Differential thermogravimetric simultaneous analyzer (TG/DTA apparatus from Hitachi High-Tech Science Corporation) was used for the water amount measurement. Incidentally, an alumina was used as the primary standard. The results of the water amount measurement (TG curves) are shown in FIG. 4.

Figure 4:
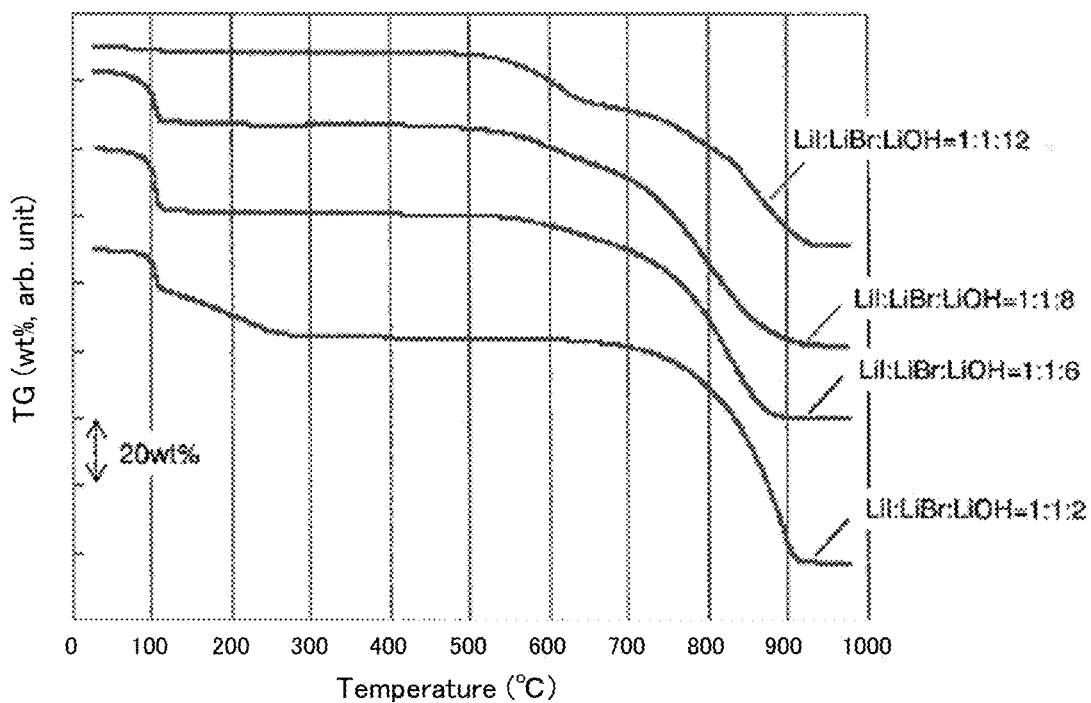
FIG. 4 is the result of the TG/DTA measurement (TG curve) for the dry samples obtained in Experiment Examples 1 to 4.

As shown in FIG. 4, the weight loss due to water evaporation was confirmed in the vicinity of 250° C. in Experiment Example 1 (LiI:LiBr:LiOH=1:1:2). On the other hand, it was confirmed that the weight loss due to water evaporation ended in the vicinity of 110° C. in Experiment Example 2 (LiI:LiBr:LiOH=1:1:6), Experiment Example 3 (LiI:LiBr:LiOH=1:1:8) and Experiment Example 4 (LiI:LiBr:LiOH=1:1:12). In other words, it was confirmed that the difference in the amount of water from the dry region (such as in the region of 300° C. to 400° C. of Experiment Examples 2 to 4) was 1% or less, even when the temperature for heating was approximately 110° C.

Figure 5:
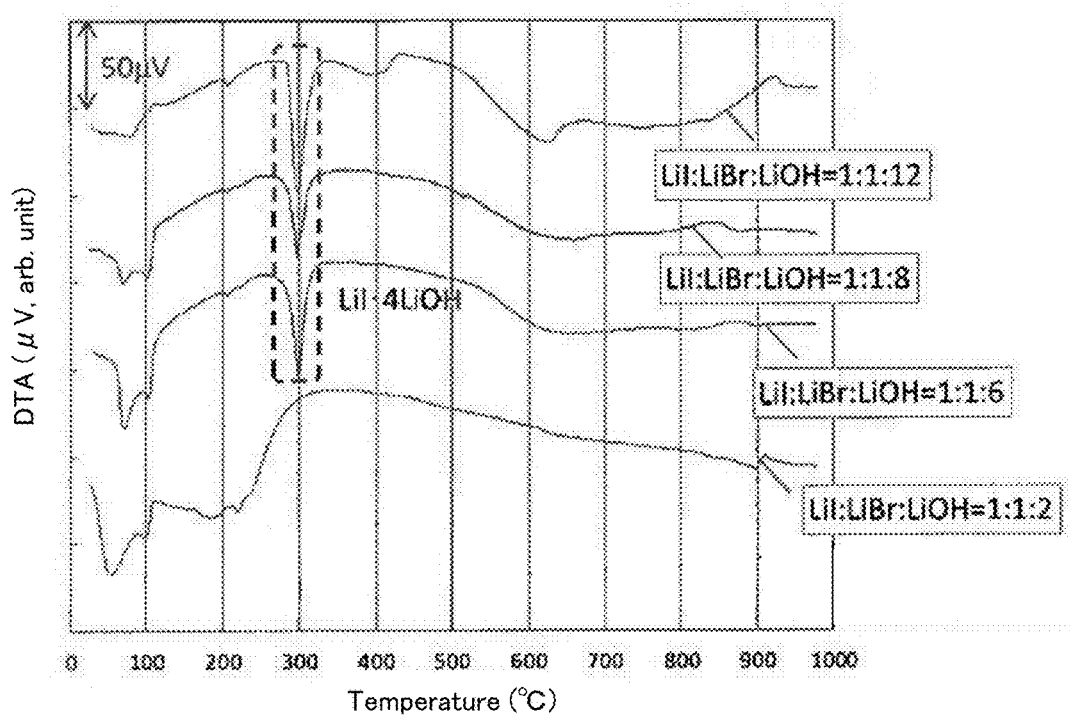
FIG. 5 is the result of the TG/DTA measurement (DTA curve) for the dry samples obtained in Experiment Examples 1 to 4.

Also, the DTA curves are shown in FIG. 5. As shown in FIG. 5, the endothermic peak presumed to be the melting reaction of LiI.4LiOH was confirmed in the vicinity of 300° C. in Experiment Example 2 (LiI:LiBr:LiOH=1:1:6), in Experiment Example 3 (LiI:LiBr:LiOH=1:1:8), and in Experiment Example 4 (LiI:LiBr:LiOH=1:1:12). Meanwhile, the endothermic peak was not confirmed in Experiment Example 1 (LiI:LiBr:LiOH=1:1:2). The suggested possibility was that the LiOH was preferentially oriented to the LiBr when the amount of LiOH was too small.

Experiment Example 5

Hydriodic acid (from Wako Pure Chemical Industries, Ltd., Guaranteed Reagent, HI content: 56.6 weight %) of 141.3 g, hydrobromide (from NACALAI TESQUE, INC., Guaranteed Reagent, HBr content: 48.1 weight %) of 157.8 g, and lithium hydroxide monohydrate ($LiOH.H_2O$, from Kojundo Chemical Lab. Co., Ltd.) of 360.8 g were mixed to obtain a mixture solution. Incidentally, the $LiOH.H_2O$ was dissolved in advance using extra pure water. The mixture solution was filtrated and then water thereof was removed by an evaporator (at the temperature of 60° C., diaphragm pump). Further, the product was dried using an oil pump (60° C.) and a liquid nitrogen trap to obtain a dry sample. The ratio of the HI, the HBr, and the LiOH was HI:HBr:LiOH=1:1.5:13.75 in the molar basis, which corresponds to LiI:LiBr:LiOH=1:1.5:11.25.

[Evaluation]

Observation of Appearance

The appearance of the dry sample obtained in Experiment Example 5 was visually observed. As the result, the dry sample obtained in Experiment Example 5 (LiOH/(LiI+LiBr)=4.5) was white bulk-like powder.

Water Amount Measurement

A water amount measurement was conducted for the dry sample obtained in Experiment Example 5. A Differential thermogravimetric simultaneous analyzer (TG/DTA apparatus from Hitachi High-Tech Science Corporation) was used for the water amount measurement. Incidentally, an alumina was used as the primary standard. The result of the water amount measurement (TG curve) is shown in FIG. 6, and the DTA curve is shown in FIG. 7.

Figure 6:
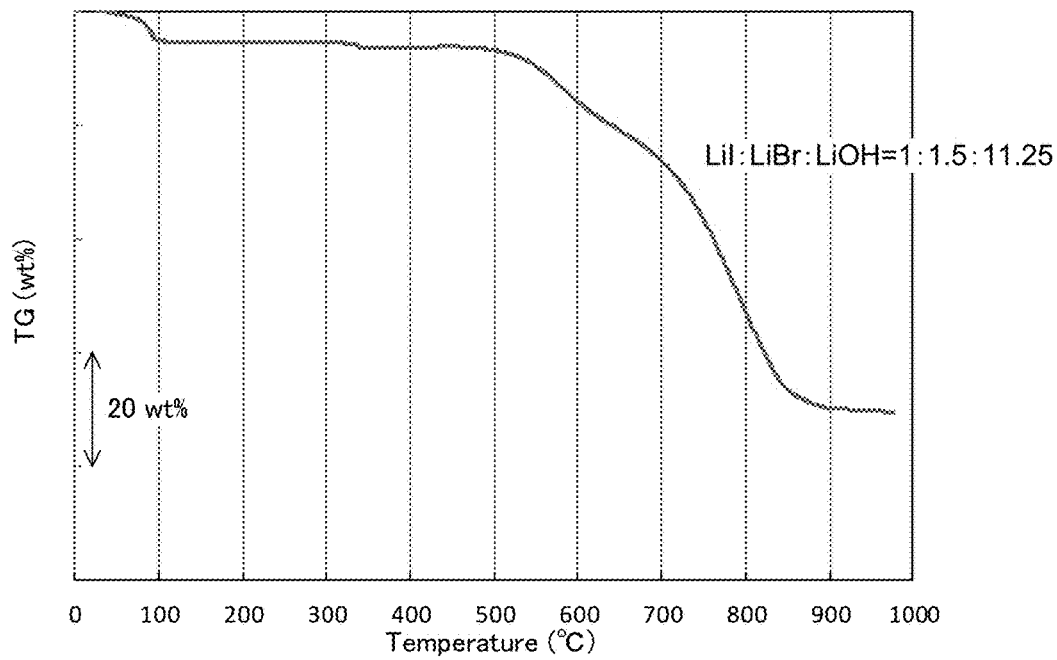
FIG. 6 is the result of the TG/DTA measurement (TG curve) for the dry sample obtained in Experiment Example 5.
Figure 7:
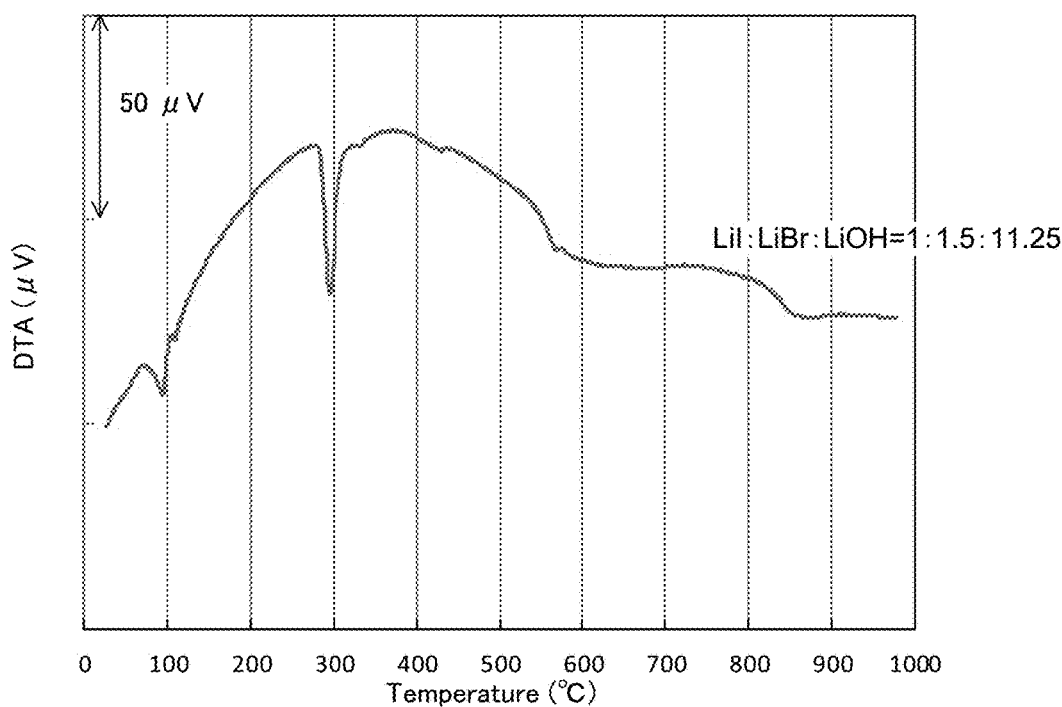
FIG. 7 is the result of the TG/DTA measurement (DTA curve) for the dry sample obtained in Experiment Example 5.

As shown in FIG. 6, it was confirmed that the weight loss due to water evaporation ended in the vicinity of 110° C. in Experiment Example 5 (LiI:LiBr:LiOH=1:1.5:11.25). In other words, it was confirmed that the difference in the amount of water from the dry region (such as in the region of 300° C. to 400° C. of Experiment Example 5) was 1% or less, even when the temperature for heating was approximately 110° C. Meanwhile, as shown in FIG. 7, the endothermic peak presumed to be the melting reaction of LiI.4LiOH was confirmed in the vicinity of 300° C. in Experiment Example 5 (LiI:LiBr:LiOH=1:1.5:11.25).

What is claimed is:

1. A method for producing a sulfide solid electrolyte material, the method comprising:
   a drying step of drying a precursor aqueous solution containing LiI, LiBr, and LiOH to remove water and obtain a precursor mixture; and
   an electrolyte synthesizing step including a sulfidization treatment to sulfurize the LiOH in the precursor mixture and obtain LiHS, a de-sulfide-hydrogenating treatment to desorb a hydrogen sulfide from the LiHS and obtain $Li_2S$, and a synthesizing treatment to make the $Li_2S$ to react with an auxiliary material; wherein
   a molar ratio of the LiOH with respect to the LiI and the LiBr, LiOH/(LiI+LiBr), in the precursor aqueous solution is 3 or more and less than 6.

2. The method for producing a sulfide solid electrolyte material according to claim 1, wherein the molar ratio of the LiBr with respect to the LiI, LiBr/LiI, in the precursor aqueous solution is 1 or more and 1.5 or less.

3. The method for producing a sulfide solid electrolyte material according to claim 1, wherein a drying temperature in the drying step is 200° C. or less.

* * * * *